(12) United States Patent
Hreha

(10) Patent No.: US 6,400,696 B1
(45) Date of Patent: Jun. 4, 2002

(54) BENT-PIPE SATELLITE SYSTEM WHICH COUPLES A LAN TO A GATEWAY AND USES A DYNAMIC ASSIGNMENT/MULTIPLE ACCESS PROTOCOL

(75) Inventor: William Hreha, San Jose, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/708,249

(22) Filed: Nov. 7, 2000

(51) Int. Cl.$^7$ ............................................... H04B 7/185
(52) U.S. Cl. ...................................... 370/316; 455/12.1
(58) Field of Search .............................. 370/310, 310.1, 370/316, 319–321, 400–402, 395.1, 431, 438, 445, 469, 466–7; 455/12.1, 13.1

(56) References Cited

U.S. PATENT DOCUMENTS

| | | | |
|---|---|---|---|
| 6,178,455 B1 * | 1/2001 | Schutte et al. | 709/228 |
| 6,201,797 B1 * | 3/2001 | Leuca et al. | 370/316 |
| 6,215,776 B1 * | 4/2001 | Chao | 370/316 |
| 6,252,952 B1 * | 6/2001 | Kung et al. | 379/114 |
| 6,272,150 B1 * | 8/2001 | Hrastar et al. | 370/486 |

* cited by examiner

Primary Examiner—David Vincent
(74) Attorney, Agent, or Firm—Kenneth W. Float

(57) ABSTRACT

Dynamic resource management systems that improve communication over a satellite communication link. The system comprises one or more personal computers coupled by way of a network to a local area network edge device. The local area network edge device communicates by way of a non-processing satellite with a gateway that interfaces to an internet service provider or corporate network. The non-processing satellite implements a bent pipe communications link between the local area network edge device and the gateway. The non-processing (bent pipe) satellite provides a fixed connectivity to an aggregation point on the ground (the gateway). The networking protocol supported by the local area network edge device is an Internet protocol (IP), such as 802.3 Ethernet, universal system bus (USB), or 802.11 Ethernet protocols, for example. Signaling in the system is based on non-asynchronous transfer mode (ATM) protocols. These protocols are preferably selected from public multiple access control signaling standards, such as digital video broadcasting—return channel over satellite (DVB-RCS), data over cable service interface specification (DOCSIS) and 802.16, for example, although other proprietary implementations may be employed. Dynamic assignment/multiple access algorithms that implement communication protocols that overlay the selected multiple access control signaling standard are employed in the system.

13 Claims, 2 Drawing Sheets

BENT-PIPE SATELLITE SYSTEM WHICH COUPLES A LAN TO A GATEWAY AND USES A DYNAMIC ASSIGNMENT/MULTIPLE ACCESS PROTOCOL

BACKGROUND

The present invention relates generally to satellite-based communication systems, and more particularly, to improved dynamic resource management systems.

The concept of using dynamic assignment/multiple access (DAMA) communication protocols on networks of limited bandwidth is general well-known. This is evident from numerous papers concerning this subject that are available on the Internet. All currently known dynamic assignment/ multiple access algorithms employ the same general concepts. An edge device (terminal) wishing to transmit data over a limited bandwidth link requests resources from a resource manager. The resource manager, based on fairness criteria, grants all or some of the resource request. The edge device accepts the allocation of resources and transmits data using the granted resources.

Referring to the drawing figures, FIG. 1 illustrates the topology of one known communications system 10 that uses a proprietary dynamic assignment/multiple access (DAMA) communication protocol to communicate over a satellite communications link. In this system 10, a number of personal computers 12 are networked to a first edge device 13 or first terminal 13, comprising customer premises equipment 13 having an antenna 14. This first edge device 13 or terminal 13 communicates by way of a processing satellite 11 that includes a switch network 15 and an antenna system 16 with a second edge device 13, or second terminal 13 comprising customer premises equipment 13 and an antenna 14. The second edge device 13 is networked to a number of personal computers 12. The personal computers 12 at each end of the communications link communicate with each other using the proprietary dynamic assignment/multiple access communication protocol.

The proprietary protocol provides that communication signals 17 (data) are routed from a transmitting edge device 13 or terminal 13 through the switch matrix 15 on the processing satellite 11 to a receiving edge device 13 or terminal 13. However, the proprietary protocol requires control signaling 18 to be routed from the transmitting edge device 13 or terminal 13 by way of the processing satellite 11 to a network control center 19 for processing, and then from the network control center 19 by way of the processing satellite 11 to the receiving edge device 13 or terminal 13.

This communications system 10 is designed to provide high-speed, cost-effective, flexible and reliable data connectivity required by market sectors including large corporate and governmental organizations, small and medium-sized businesses, and consumers and small office/home office (SOHO). These services are provided through meshed connectivity directly between two or more edge devices 13. One of the edge devices 13, acting as a gateway may be connected to terrestrial transport systems, such as the public switched telephone network (PSTN) or the Internet. This is enabled by the processing satellite 11 which provides a switch fabric and queuing functions (switch network 15)

The multiple access control signaling within this communications system 10 is a proprietary protocol based on an asynchronous transfer mode (ATM) protocol. Using the asynchronous transfer mode (ATM) protocol, the system 10 will accommodate multiple types of data, video or voice traffic. The asynchronous transfer mode (ATM) has the ability to guarantee quality-of-service levels. Because the satellite 11 in this system 10 is a processing satellite 11, the allocation of resources is highly dependent on resources implemented on the satellite 11.

Direct internet access is more desirable than obtaining access via meshed private networks. It would be desirable to have systems that improve the bandwidth efficiency of its communications link. Furthermore, it would be desirable to have systems that require control signaling to be negotiated directly between the source and destination terminals. It would also be desirable to have a system whose performance is not dependent upon the availability of resources on a satellite. It is therefore an objective of the present invention to provide for a more efficient dynamic resource management systems.

SUMMARY OF THE INVENTION

To accomplish the above and other objectives, the present invention provides for dynamic resource management systems that improve communication between a local area network edge device and a gateway that interfaces to an internet service provider or corporate network. The system comprises one or more personal computers coupled by way of a network to the local area network edge device. The local area network edge device communicates by way of a non-processing satellite with the gateway.

The non-processing satellite implements a bent pipe communications link between the local area network edge device and the gateway. The non-processing (bent pipe) satellite provides a fixed connectivity to an aggregation point on the ground comprising the gateway.

The networking protocol supported by the local area network edge device is an Internet protocol (IP), such as 802.3 Ethernet, universal system bus (USB), or 802.11 Ethernet protocols, for example. Signaling in the system is based on non-asynchronous transfer mode (ATM) protocols. These protocols are preferably selected from public multiple access control signaling standards, such as digital video broadcasting—return channel over satellite (DVB-RCS), data over cable service interface specification (DOCIS) and 802.16, for example, although other proprietary implementations may be employed. dynamic assignment/multiple access algorithms that implement communication protocols that overlay the selected multiple access control signaling standard are employed in the system.

BRIEF DESCRIPTION OF THE DRAWINGS

The various features and advantages of the present invention may be more readily understood with reference to the following detailed description taken in conjunction with the accompanying drawings, wherein like reference numerals designate like structural element, and in which.

DETAILED DESCRIPTION

Figure 1:
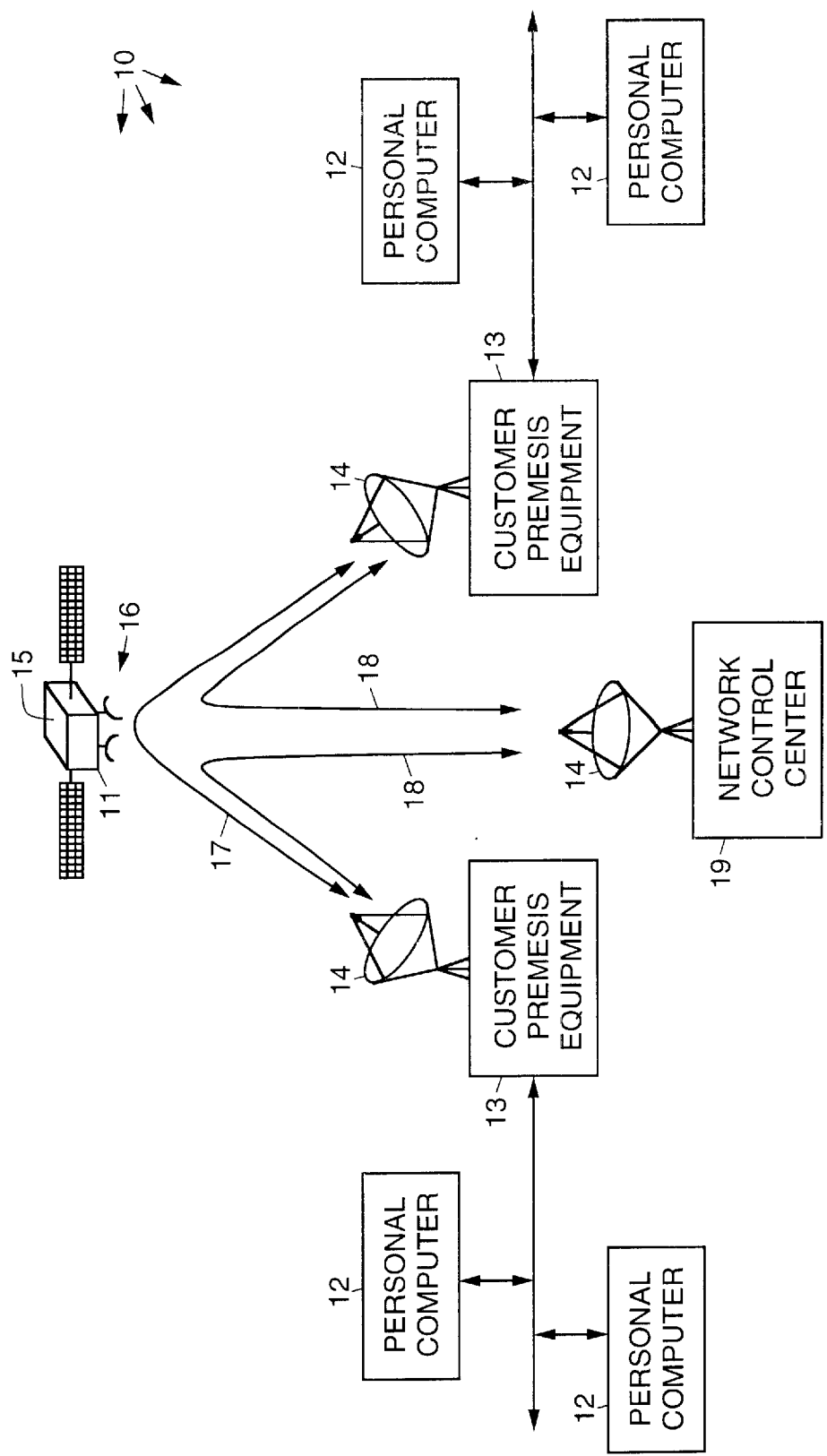
FIG. 1 illustrates the topology of a known communications system in accordance with the principles of the present invention.
Figure 2:
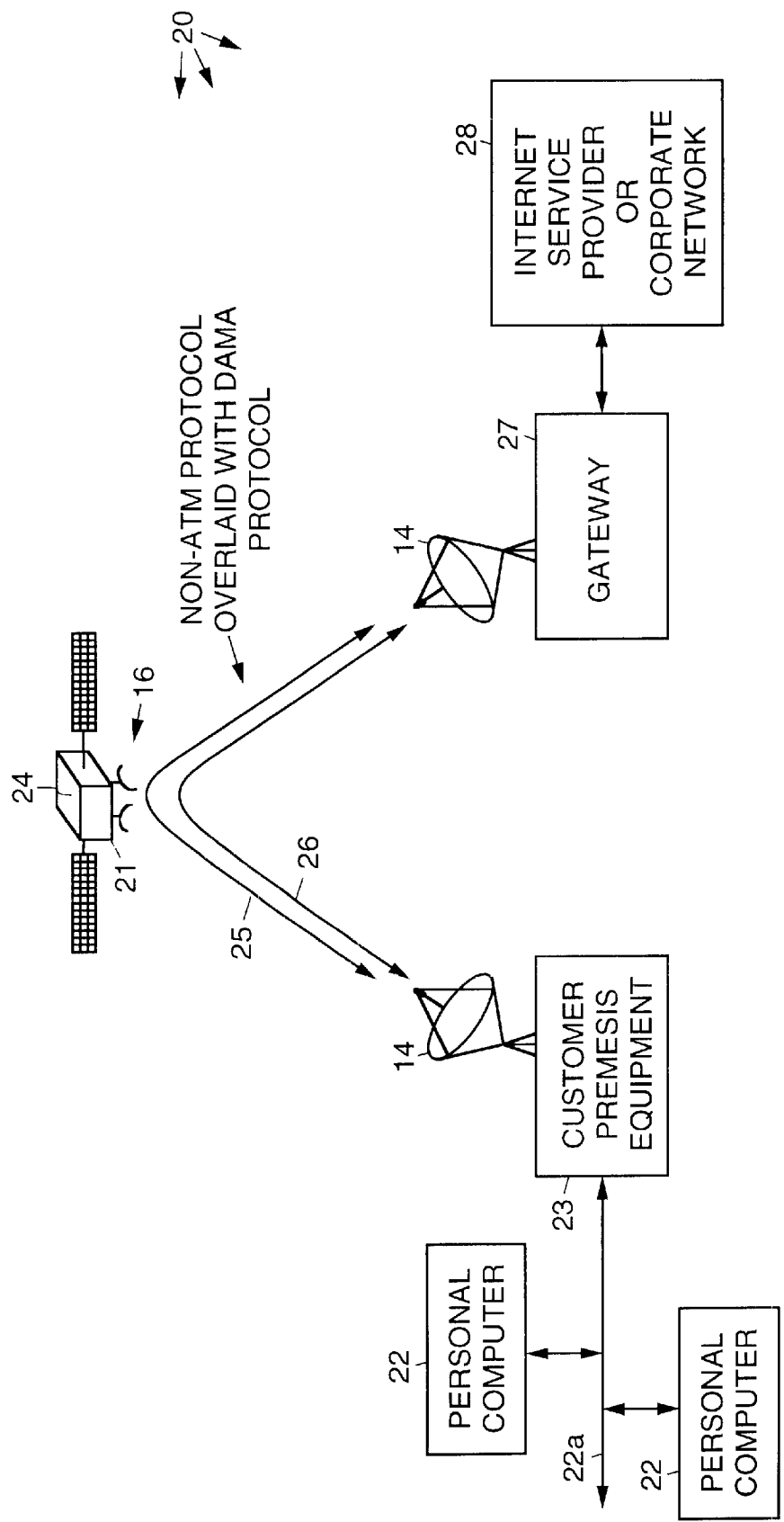
FIG. 2 illustrating the topology of an exemplary communications system in accordance with the principles of the present invention.

Referring again to the drawing figures, FIG. 2 illustrating the topology of an exemplary communications system 20 in accordance with the principles of the present invention. The system 20 comprises one or more personal computers 22 that are coupled by way of a network 22a to a local area network edge device 23 or first terminal 23, comprising customer premises equipment 13 having an antenna 14. The personal computers 22 may be networked by way of an Ethernet network 22a, for example. The local area network edge device 23 communicates by way of a non-processing satellite 21 having an antenna system 16 with a gateway 27 having an antenna 14. The gateway 27 interfaces to one or more internet service providers 28 or a corporate network 28. The non-processing satellite 21 includes an antenna system 16 and implements a bent pipe communications link 24 between the local area network edge device 23 and the gateway 27.

The present system 20 is designed to provide high-speed, cost-effective, and reliable data connectivity required by consumers and small office/home office (SOHO) markets. The networking protocol supported by the local area network edge device 23 is an Internet protocol (IP). Internet protocol (IP) signals may be routed using 802.3 Ethernet, universal system bus (USB), 802.11 Ethernet, or other known or future protocols.

The service provided by the present system 20 is provided through a point to point connectivity between the local area network edge device 23 and a data source 28 such as either an internet service provider 28 or their corporate network 28. This is enabled by the non-processing (bent pipe) satellite 21 that provides a fixed connectivity to an aggregation point on the ground comprising the gateway 27.

Resource allocations are based on consumer profiles, communication link bandwidth limitations, and end-to-end error rate performance. Typical resource allocations include time slots and frequency assignments to be used by the edge device 23. The resource allocations are determined by algorithms operating at the Gateway 27.

Signaling within the present system 20 is based on non-ATM protocols. These are preferably selected from public multiple access control signaling standards. Such public multiple access control signaling standards include digital video broadcasting—return channel over satellite (DVB-RCS), data over cable service interface specification (DOCSIS) and 802.16, for example. However, it is to be understood that other multiple access control signaling standards may be employed.

For example, signaling may be based on a proprietary protocol known as SATMAC, developed by the assigned of the present invention. Each of these multiple access control signaling standards supports both in-band and out-of-band signaling. Furthermore, signaling may be based on derivatives of the above-mentioned standards. The present system 20 employs dynamic assignment/multiple access algorithms that are built on top of (or overlay) a selected one of the above-mentioned multiple access control signaling standards. Although any of the above-mentioned multiple access control signaling standard may be employed in the system 20, the one that provides the best bandwidth efficiency is a preferred choice for final implementation.

The system 20 accommodates multiple types of data, video or voice traffic. Quality-of-service levels may be guaranteed by the use of differentiated services (DIFSERV)-like protocols. Link fragmentation and interleaving (LFI) protocols or frame relay fragmentation (FRF. 12) protocols are also employed by system 20 to handle the variable sized IP packets.

Dynamic assignment/multiple access algorithms that implement communication protocols in the local area network edge device 23 may include the following types of algorithms, for example. A first is an application detection algorithm. Another is an application prioritization algorithm, Another may be an algorithm that estimates resource requirements based on queue statistics versus performance statistics. Another is an algorithm that generates a resource request or sends raw queue statistics to the gateway 27 to set required resources. Another is an algorithm that performs a weighted fair queuing that drains the queues while effectively utilizing the gateway assigned resources.

Algorithms that may be implemented in the gateway 27 may include the following types of algorithms, for example. One algorithm is an algorithm that accumulates all requests received at substantially the same time. Another is an algorithm that functions to assign each edge device a time and frequency resources based upon services classes and consumer profile for each current and previous request.

The present system 20 is substantially different from the prior system 10 discussed in the Background section for various reasons. Firstly, the markets, systems, and services are significantly different between these two implementations. The prior system 10 has to be concerned with the availability of the destination. These concerns are minimized in the present system 20.

In the prior system 10, processing payload implementations require that the dynamic assignment/multiple access algorithms concern themselves with the availability of resources within the satellite 11. The present system 20 does not have this concern. Concerns regarding congestion control are significantly different between the two systems. The present system 20 does not support meshed networks, while the prior system 10 does.

Because the multiple access control (MAC) protocols are different in the two systems, the dynamic assignment/ multiple access algorithms are not the same. The information available is also different. The timing on processing is also different. Furthermore, the messaging between protocol layers is different.

The network elements in the present system 20 are considered to be always on, which is not necessarily the case with the prior system 10. Also, because of the implementation of different multiple access control (MAC) protocols and the different topologies of the two systems, the timing and synchronization mechanisms are likely to be different. This requires different algorithms in the respective systems.

Thus improved dynamic resource management systems have been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A dynamic resource management system comprising:
 a local area network edge device;
 one or more personal computers coupled to the local area network edge device by way of a network;
 a gateway;
 a data source coupled to the gateway; and
 a satellite that provides a communications link between the local area network edge device and the gateway;
 the local area network edge device and the gateway implementing signaling based on a non-asynchronous transfer mode (ATM) protocol, and wherein the non-asynchronous transfer mode protocol is overlaid with one or more dynamic assignment/multiple access communication protocols.

2. The system recited in claim 1 wherein the network comprises an Ethernet network.

3. The system recited in claim 1 wherein the satellite implements a bent pipe communications link between the local area network edge device and the gateway.

4. The system recited in claim 1 wherein the one or more personal computers communicate with the local area network edge device using an Internet protocol (IP).

5. The system recited in claim 4 wherein the Internet protocol (IP) comprises an 802.3 Ethernet protocol.

6. The system recited in claim 4 wherein the Internet protocol (IP) comprises an universal system bus (USB) protocol.

7. The system recited in claim 4 wherein the Internet protocol (IP) comprises an 802.11 Ethernet protocol.

8. The system recited in claim 7 wherein the data source comprises an internet service providers.

9. The system recited in claim 1 wherein the data source comprises a corporate network.

10. The system recited in claim 1 wherein resource allocations are based on consumer profiles, communication link bandwidth limitations, and end-to-end error rate performance.

11. The system recited in claim 1 wherein the non-asynchronous transfer mode protocol is selected from the group consisting of digital video broadcasting—return channel over satellite (DVB-RCS), data over cable service interface specification (DOCSIS) and 802.16 standards.

12. The system recited in claim 1 wherein the non-asynchronous transfer mode protocol supports both in-band and out-of-band signaling.

13. The system recited in claim 1 wherein the satellite comprises a non-processing satellite.

* * * * *